Aug. 25, 1953     T. L. FRANKFOTHER     2,650,101
AUXILIARY TYPE SAFETY TRAILER HITCH
Filed July 13, 1951
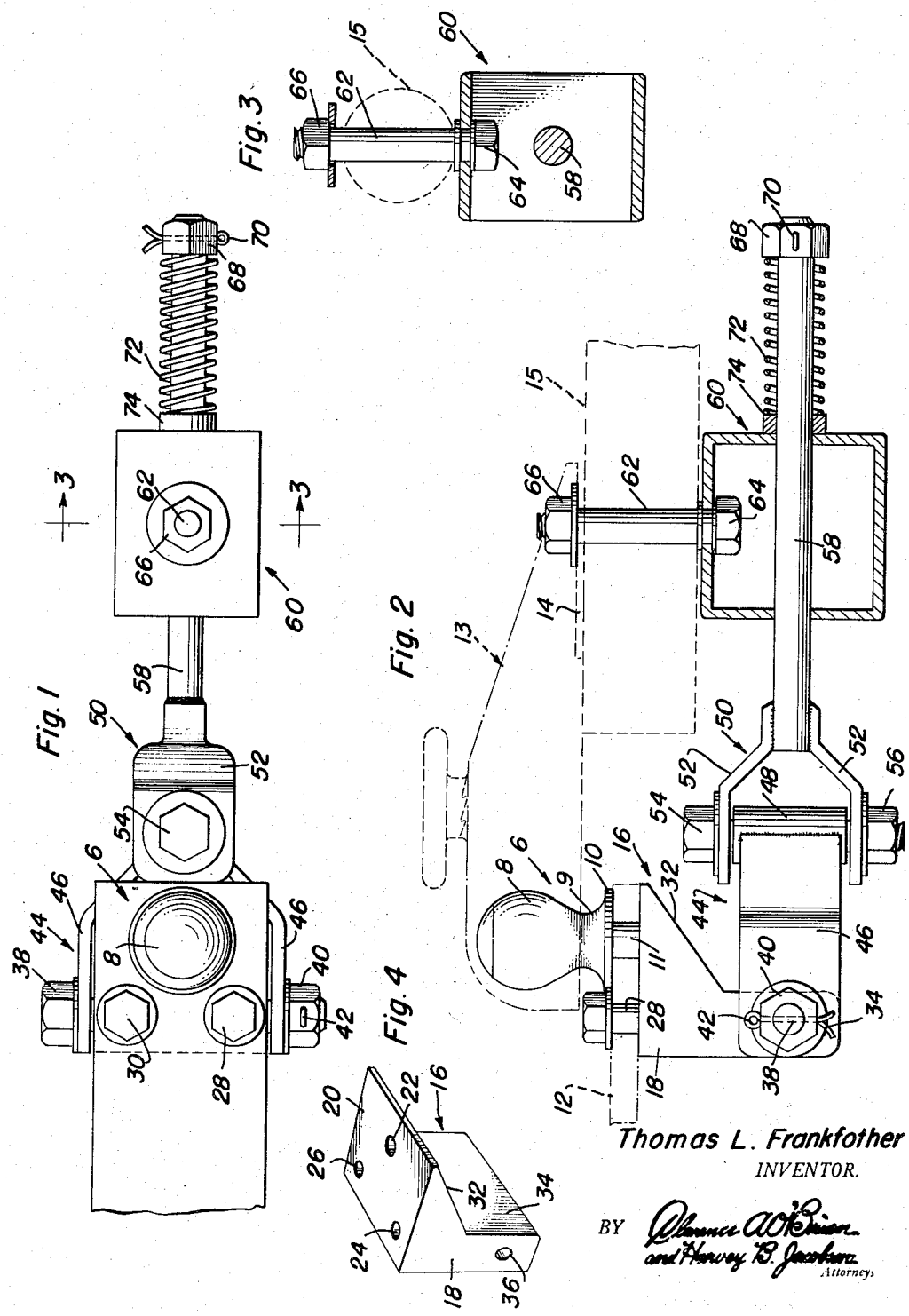
Thomas L. Frankfother
INVENTOR.

Patented Aug. 25, 1953

2,650,101

UNITED STATES PATENT OFFICE 2,650,101

AUXILIARY TYPE SAFETY TRAILER HITCH

Thomas L. Frankfother, Oklahoma City, Okla., assignor of fifty per cent to A. D. Larson, Oklahoma City, Okla.

Application July 13, 1951, Serial No. 236,597

2 Claims. (Cl. 280—33.9)

The present invention relates to certain new and useful improvements in auxiliary-type safety trailer hitches and, as the title implies, has reference in particular to an added hitch construction which is to be used in conjunction with the customary or conventional ball and socket main hitch between draft means on a tractor or other leading vehicle and a trailer tongue.

The art to which the invention relates reveals that many and varied styles and forms of safety-type auxiliary trailer hitches have been evolved and produced for use. It will be clear, therefore, that the primary object of the auxiliary hitch herein under advisement is to structurally, functionally and otherwise improve upon and simplify prior art constructions and, in so doing, to thus provide a highly practical adaptation in which manufacturers, users and others will find their respective requirements and needs fully met and effectually available.

It is another object of the invention to simplify and reduce the number of mechanical expedients which are utilized in the over-all improved hitch, to provide a strong and durable construction and to more aptly meet the safety requirements of all concerned.

More specifically, another object of the invention has to do with a safety-type auxiliary hitch which is characterized by a sturdy and reliable adapter bracket which is carried by the draft member, which is itself separably fastened to said member and which paves the way for a simplified and practical mode of installing universal joint means, a part of the auxiliary hitch, on said draft member, the latter end being attained by a bolt which is separably journaled in a bearing provided therefor on said adapter bracket.

A still further object of the invention has to do with maintaining effective tracking and control of the trailer tongue in the event that the main hitch is in any manner disabled, this result being obtained through the adoption and use of a simple frame or yoke which is bolted to the trailer tongue and which is slidably mounted on an auxiliary draft rod and is cushioned by novelly arranged spring means.

Other objects and advantages will become more readily apparent from the following description and the accompanying sheet of illustrative drawings.

In the accompanying sheet of drawings wherein like numerals are employed to designate like parts throughout the views:

Figure 1 is a top plan view of the complete auxiliary hitch with the trailer tongue and female socket unit of the regular hitch omitted and with the draft member appearing in full lines.

Figure 2 is a fragmentary side view which is essentially in elevation, partly in section and partly in phantom lines.

Figure 3 is a section taken on the line 3—3 of Figure 1, looking in the direction of the arrows.

Figure 4 is a perspective view of the adapter bracket.

Taking up now the detail description and with reference to the full assembly view, Figure 2, the numeral 6 designates the male unit of the usual or regular hitch means. This is characterized by a ball head or joint member 8, a neck 9 with a flange 10 and a screw-threaded stud 11. This is adapted to be fixedly mounted on the draft member 12 which, in practice, is connected to the lead vehicle (not shown). The female unit of the hitch or main coupling is denoted by the numeral 13 and is of conventional construction and has a socket operatively and swivelly connected with the ball joint 8 and has suitable body means 14 which is bolted or otherwise fixedly secured to the trailer tongue 15. These are all old parts.

The auxiliary hitch comprises an adapter bracket 16 which is characterized by substantially rectangular solid block or equivalent body 18. This has a flat top surface 20 which is here provided with several screw-threaded sockets, one socket 22 being adapted to accommodate the screw-threaded end of the stud 11. The other two sockets 24 and 26 are adapted to accommodate the bolts or studs 28 and 30. It will be noted in this connection that the block is thus separably joined with the draft member 12. The block also provides a satisfactory ways and means of mounting and clamping the stud 11 of the unit 6 on the draft member. It may be mentioned, in this connection, that the stud 28 could be integral with the block and pass through holes in the draft member and secured in place by a nut as is obvious, this being an alternative arrangement. Likewise, the unit 6 may be mounted independently of the adapter bracket, if desired. The forward face of the block is under-cut or bevelled as at 32 to provide clearance for operation of other associated parts. The lower pendant portion 34 is provided with a horizontal bearing 36 for a bolt 38 held in place by a nut 40 and associated cotter key 42. This bolt constitutes the means for pivotally connecting the forward clevis 44 with the adapter bracket. The clevis embodies arms 46 and a vertical bearing 48. The rear clevis is denoted by the numeral 50 and comprises arms 52—52 connected with a bolt 54 passing through the bearing 48 held in place by a nut 56. This provides a common universal joint between the adapter bracket and the auxiliary draft rod 58. Specifically, the clevis 50 is secured to the leading end of said rod. The means for joining the rod with the tongue 15 comprises a rectangular frame or yoke 60 secured by a bolt 62 to the tongue 15. The head of the bolt is denoted at 64 and the nut at 66. It may be desirable to use the same bolt for joining both the yoke and the female coupling unit 13 to the stated tongue. The yoke is slidable on the intermediate portion of the draft rod and cushioning and shock absorbing means is provided. That is to say, there is a nut 68 on the trailing end of the rod held in place by a cotter key 70 and a coil spring 72 surrounds the rod and bears at one end against the nut and at the opposite end against a thrust washer 74 which in turn has contact with the adjacent vertical side member of the yoke. The trailer tongue 15, unit 13, bolt means and yoke constitute an assembly which moves in unison.

The complemental assembly comprises then the draft member 12, the adapter bracket or block 16 which is separably bolted thereto, the universal joint means which is separably connected with the bracket and the rod 58 carried by said universal joint means and serving as a mount for the reciprocable yoke 60. It will be evident therefore that the presence of this auxiliary hitch means does not in any manner alter or interfere with the operation of the regular means hitch or coupling comprising the units 6 and 13. Therefore, the latter parts function as is usual. However and in the event that said main hitch should become disabled by breakage of either of the units 6 or 13, the auxiliary hitch then automatically comes into play. The yoke 60 will slide rearwardly on the auxiliary draft rod and the shock will be cushioned by the spring means 71. With the spring compressed it is obvious that the load will be transmitted by way of the bolt 62, yoke 60 and rod 58 to the universal joint and through the universal joint to the adapter bracket 16 which is bolted to the draft member 12. When the unit 13 is detached from the unit 6 by separating the tongue 15 from the draft member 12, the bolt 38 is obviously detached from the adapter bracket 16. Under this arrangement the universal joint auxiliary rod 58 and associated parts then become an assemblage carried by the draft tongue 15.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. In a structure of the class described, in combination, a draft member, an adapter bracket having a portion fitted against the bottom of said draft member, a hitch unit seated atop said draft member, means piercing said draft member and joining said hitch unit and adapter bracket together and clamping the draft member therebetween, said adapter bracket having a depending portion provided with a bolt accommodating bearing, said bearing being horizontally disposed, a bolt mounted in said bearing, a first horizontally disposed clevis having arm portions straddling said adapter bracket and hingedly connected to cooperating end portions of said bolt, said clevis having a vertical bearing integral therewith, a second vertically disposed clevis having arms straddling upper and lower end portions of said last-named bearing, an assembling and pivoting bolt joined with the last-named clevis arms and mounted for rotation in said last-named bearing, a yoke in the form of a frame, said yoke being adapted to be bolted on a trailer tongue, a rod having an intermediate portion slidable through bearing openings provided therefor in vertical portions of said yoke, said rod having a leading end integrated with said second-named clevis and having a trailing end projecting rearwardly beyond said yoke, and a cushioning spring encircling said rearwardly projecting end portion and bearing against an adjacent portion of said yoke.

2. An attachment for a draft member and trailer tongue comprising a yoke in the form of an open rectangular frame, a single bolt joined with one marginal side portion of said yoke and adapted for mounting the yoke on a trailer tongue, an auxiliary rod slidably mounted intermediate its ends in openings provided therefor in the vertical marginal members of said frame, the trailing end of said rod projecting rearwardly beyond an adjacent vertical member of said frame and terminating in a removable nut, a constantly exposed coil spring surrounding said trailing end and bearing against said nut at one end and against said frame at its other end, the leading end of said rod projecting forwardly beyond said frame, a bolt-equipped clevis fixedly secured on said leading end, a second complemental clevis having a bearing, the bolt in the bolt equipped clevis passing through said bearing, an adapter bracket having a bearing, the arms of said second named clevis straddling said adapter bracket, a bolt mounted in the bearing in said adapter bracket and separably joining said arms with said adapter bracket, and means for positioning and operatively mounting said adapter bracket on the stated draft member.

THOMAS L. FRANKFOTHER.

References Cited in the file of this patent

UNITED STATES PATENTS

| Number | Name | Date |
|---|---|---|
| 929,046 | Stoa | July 27, 1909 |
| 1,289,141 | Ferris | Dec. 31, 1918 |
| 1,908,711 | Kuchar | May 16, 1933 |
| 2,459,965 | Robertson | Jan. 25, 1949 |
| 2,579,319 | Hudson | Dec. 18, 1951 |

FOREIGN PATENTS

| Number | Country | Date |
|---|---|---|
| 539,690 | Great Britain | Sept. 19, 1941 |